United States Patent Office 3,517,175
Patented June 23, 1970

3,517,175

DIGITAL SIGNAL COMPARATORS

Raymond T. F. Williams, Ilford, England, assignor to The Plessey Company Limited, Ilford, England, a British company Filed Aug. 15, 1967, Ser. No. 660,653
Claims priority, application Great Britain, Aug. 25, 1966, 38,188/66
Int. Cl. G06f 7/04
U.S. Cl. 235—177 4 Claims

ABSTRACT OF THE DISCLOSURE

A digital signal comparator in which two series connected transistors are connected in parallel with a number of similarly connected transistors such that the total conductance of the parallel circuit is varied in response to the conduction of any pair of transistors. The transistors are switched on and off in accordance with the outputs of shift register stages.

This invention relates to digital signal comparator and is especially directed to the provision of a field effect transistor integrated circuit digital signal comparator. A field-effect transistor will be hereinafter referred to as an F.E.T.

Hitherto, digital signal comparators or correlators have comprised a number of correlator stages formed by combinations of resistors, capacitors, inductors and active elements, which tend to give rise to bulky assemblies, having large numbers of connecting leads provided between adjacent stages. These connecting leads may be provided by wire or printed circuit conductors. In both these cases the provision of extra stages of comparison would involve the introduction of many more interconnecting leads thereby making the digital signal comparator even more bulky.

It is an object of the invention to provide an improved form of digital signal comparator which is not bulky, and which minimises the introduction of further interconnecting leads with the introduction of more stages of comparator.

It is another object of the present invention to provide a digital signal comparator arrangement for comparing a digital information signal with a digital reference signal and for generating an analogue output signal in dependence upon the degree of correspondence between the two signals.

It is a further object of the invention to provide a digital signal comparator arrangement for affording a numerical indication of the degree of correspondence between a digital information signal and a digital reference signal.

Figure 1:
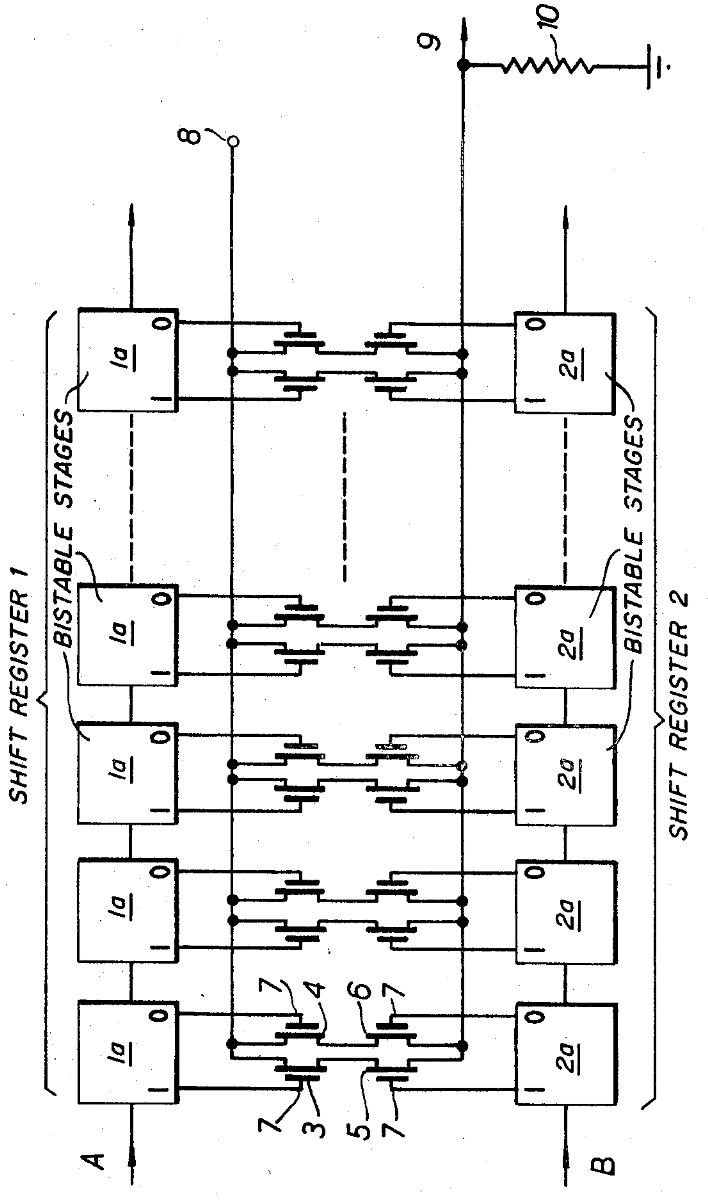
Figure 2:
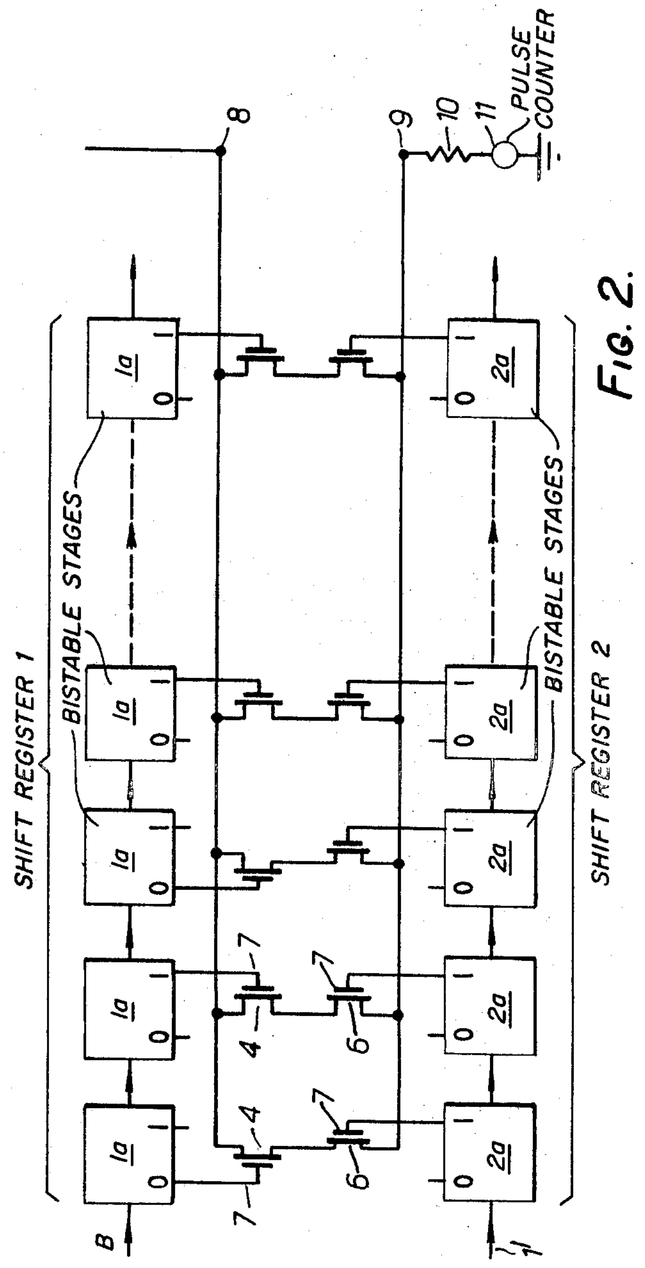

Two embodiments of the invention will now be described by way of example with reference to the accompanying drawings, in which, FIG. 1 shows a circuit arrangement of an F.E.T. integrated circuit digital signal comparator according to the invention; and, FIG. 2 shows a circuit arrangement of a further digital signal comparator according to the invention.

FIG. 1 shows an F.E.T. integrated circuit digital signal comparator circuit comprising two independent shift registers 1 and 2, each formed by a plurality of serially connected bistable stages *1a* and *2a*, respectively. Corresponding stages of the two shift registers are interconnected by four F.E.T.'s 3, 4, 5 and 6, each having a gate 7.

The F.E.T.'s 3 and 5 and the F.E.T.'s 4 and 6 are each connected in series, each pair of transistors being connected in parallel between two lines which terminate in output terminals 8 and 9, respectively. The output terminal 9 is connected to earth potential via a resistor 10, the output terminal 8, in practice, being connected to a source of D.C. potential (not shown).

The shift registers 1 and 2 are of the type which may be "clocked" independently and hold their state for an indefinite time, consequently one may be used for semi-permanently storing a reference signal. Each of the stages *1a* or *2a* of the shift registers 1 and 2 have two outputs designated "1" and "0", and it should be understood that when a bistable stage is in one of its stable conditions (designated its "1" position) a positive or negative voltage (depedent upon whether positive or negative logic is being used) will be obtained on the "1" output whilst zero or earth potential will be obtained in the "0" output. When the bistable stage is in the other of its two stable conditions (designated its "0" condition) a positive or negative voltage will be obtained on the "0" output and a zero or earth potential will be obtained on the "1" output."

In the operation of the device, if shift register 1 has a reference digital signal A applied to it and the second shift register 2 has applied to it an information digital signal B at the same digit frequency as the signal A, then should a "1" appear at the gate 7 of F.E.T. 3, thereby rendering the F.E.T. conductive, at the same instant in time as a "1" on the gate 7 of F.E.T. 5 renders F.E.T. 5 conductive, a conductive path will be formed between the output terminals 8 and 9 thereby allowing current to flow through F.E.T.'s 3 and 5, and through resistance 10, causing a voltage to be developed on output terminal 9 which is dependent upon the conductance of the conductive path (or paths) between the output terminals 8 and 9.

Should the voltage levels on the gates of F.E.T.'s 3 and 5, F.E.T.'s 4 and 6 or any other pairs of gates be "1" and "0" there will be no conduction path between the output terminals 8 and 9 via the corresponding pair of F.E.T.'s. Should the voltage level corresponding to "0" appear on the gates 7 of any pair of F.E.T.'s say F.E.T.'s 4 and 6, and then again there will be no conduction path between the output terminals 8 and 9 via this pair of F.E.T.'s.

Furthermore, each stage of each shift register is arranged so that if one of the outputs shows a binary "0" condition the other output will show a binary "1" condition. Therefore, if either of the pairs of F.E.T.'s 3 and 5, or 4 and 6, show a binary "0" condition on their gates 7 and consequently do not form a conductive path between the output terminals 8 and 9, then the other pair of F.E.T.'s will show the binary "1" condition and will form a conductive path.

Since each pair of F.E.T.'s is connected across the output terminals 8 and 9, the conductance provided by each pair of F.E.T.'s, at any instant in time, add up in parallel to effectively increase the overall conductance in proportion to the number of conductive paths occurring simultaneously at one instant in time. Consequently it will be readily appreciated that the output voltage at terminals 8 and 9 is dependent upon the number of conduction paths occurring at the same time, which in turn is dependent upon the number of identical binary bits occurring simultaneously in the information and reference signals. Therefore, the amplitude of the voltage appearing at terminal 9 will be indicative of the comparison between the digital signals A and B.

It is envisaged with the present invention, to mount the comparator and appertaining register stages, as shown by FIG. 1, on a single integrated circuit chip as well as, if necessary, means for measuring the comparator output. Furthermore, the addition of another such device would not necessitate any additional interconnections between the two devices above that number required for making connections to only one of the devices.

The accuracy of the above described comparator is dependent upon the accuracy to which the conductances of the F.E.T.'s can be matched when these latter are conducting. Ideally, the conductances of the F.E.T.'s, when conducting should be the same, but since in practice this is not the case, the output signal appearing at output terminal 9 may be subject to error. A more accurate comparison may be obtained by counting the number of stages of the two shift registers which contain corresponding information.

This arrangement comprises two shift registers 1 and 2 as in the comparator of FIG. 1, but now the information digital signal B is applied to shift register 1 and a so-called strobe pulse 1' is applied to shift register 2. Since the signal pattern of the digital signal B is known, corresponding stages of the shift registers 1 and 2 are now interconnected with a single pair of F.E.T.'s, connected in dependence upon the information the digital signal B is expected to set into that stage of the shift register 1. Thus, if a particular stage of the shift register 1 is expected to be set to a "1" condition the gates of F.E.T.'s 4 and 6 are connected to the "1" side of the particular stages of the shift registers 1 and 2, whereas if a "0" condition is expected, then the gates of F.E.T.'s 4 and 6 are connected to the "0" side of the particular stage of shift register 1 and to the "1" side of the particular stage of shift register 2, respectively. For every clock pulse applied to shift register 1 there is applied N clock pulses to shift register 2, where N is the number of stages of the shift registers 1 and 2, so that when shift register 1 is set in a particular condition by digital signal B, the strobe pulse 1' is caused to be moved through shift register 2, thereby causing each of the stages of shift register 2 to be operated in turn. If there is correspondence between an operated stage of shift register 2 and the corresponding stage of shift register 1, then the two F.E.T.'s associated with those stages will be caused to become conductive so that a conductive path is formed between output terminals 8 and 9.

Output terminal 8 is connected to a source of D.C. potential (H.T.) as before and output terminal 9 is connected to earth via resistor 10 and a pulse counter 11. The pulse counter 11 is arranged so that it counts the number of times a conductive path is formed between the output terminals 8 and 9. Consequently, for each clock pulse applied to shift register 1, the count of the pulse counter 11 will be indicative of the number of stages of the two shift registers between which there is correspondence. Thus, if there are N stages in each of the shift registers 1 and 2, and the pulse counter affords a count of N, then this will indicate that the digital signal B has the expected signal pattern.

The invention described above lends itself readily to microminiaturisation techniques, and an arrangement providing ten stages of comparison on a single substrate, contained within a conventional transistor "can" of about ¼" in diameter, has been constructed. As new developments arise it will be possible to increase the density of circuits on the same substrate without increasing the number of connections to it. Furthermore, the second embodiment hereinbefore described can be produced in an even more compact form since the number of F.E.T.'s required is half that of the first embodiment.

What I claim is:

1. A digital signal comparator arrangement comprising a plurality of serially-connected bistable stages each having a first and a second output, said stages forming a first shift register, means for applying a digital information signal to the first shift register, a plurality of serially-connected bistable stages each having a first and a second output, said latter stages forming a second shift register, means for applying a digital reference signal to the second shift register, a plurality of pairs of serially-connected transistors, the pairs of serially-connected transistors being connected in parallel, the first transistors of each pair having their control terminals respectively connected to the first and second outputs of the bistable stages of the first shift register and the other transistors of each pair having their control terminals respectively connected to the first and second outputs of the bistable stages of the second shift register such that either the one or the other transistor pair becomes conductive when correspondence occurs between corresponding outputs of the bistable stages, and output means to which the parallel-connected pairs of transistors are connected, the output means being effective for producing an analogue output signal indicative of the number of stages of the two shift registers between which correspondence obtains.

2. A digital signal comparator arrangement according to claim 1, in which the transistors are field effect transistors.

3. A digital signal comparator arrangement comprising a plurality of serially-connected bistable stages each having a plurality of outputs, said stages forming a first shift register, means for applying a digital information signal to the first shift register, a plurality of serially-connected bistable stages each having a plurality of outputs, said latter stages forming a second shift register, means for applying a digital strobe signal to the second shift register, the digital strobe signal being effective for causing each stage of the second shift register to be operated for every digit of the digital information signal applied to the first shift register, a plurality of pairs of serially-connected transistors being connected in parallel, one transistor of one of said pairs having its control terminal connected with an output of each stage of the first shift register and the other transistor of said one of said pairs having its control terminal connected with an output of a corresponding stage of the second shift register in dependence upon the expected state of the stage of the first shift register due to said digital information signal, such that each transistor of a pair becomes conductive when the output of the connected stage of the first shift register attains its expected state, and output means including a pulse counter for producing a numerical indication of the number of stages of the first shift register which have attained their expected state.

4. A digital signal comparator arrangement according to claim 3, in which the transistors are field effect transistors.

References Cited

UNITED STATES PATENTS

| | | | |
|---|---|---|---|
| 2,615,127 | 10/1952 | Edwards | 340—149 |
| 2,641,696 | 6/1953 | Woolard | 340—146.2 |
| 2,831,987 | 4/1958 | Jones | 340—146.2 |
| 3,139,523 | 6/1964 | Luke | 340—146.2 |
| 3,174,032 | 3/1965 | White | 235—181 |
| 3,299,291 | 1/1967 | Warner et al. | 307—215 |
| 3,346,844 | 10/1967 | Scott et al. | 340—146.2 |
| 3,376,411 | 4/1968 | Montani et al. | 235—181 X |

EUGENE G. BOTZ, Primary Examiner

F. D. GRUBER, Assistant Examiner

U.S. Cl. X.R.

307—205, 221; 328—37; 340—146.2